United States Patent
Kim et al.

(10) Patent No.: US 12,451,163 B2
(45) Date of Patent: Oct. 21, 2025

(54) APPARATUS AND METHOD FOR AUDIO-VIDEO SAMPLING FREQUENCY RATIO UNIFICATION

(71) Applicant: ELECTRONICS AND TELECOMMUNICATIONS RESEARCH INSTITUTE, Daejeon (KR)

(72) Inventors: Yoonhyung Kim, Daejeon (KR); Byung Ok Kang, Daejeon (KR); Hoon Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 30 days.

(21) Appl. No.: 18/413,991

(22) Filed: Jan. 16, 2024

(65) Prior Publication Data

US 2024/0282345 A1 Aug. 22, 2024

(30) Foreign Application Priority Data

Feb. 22, 2023 (KR) .......................... 10-2023-0023458

(51) Int. Cl.
  *G06V 10/20* (2022.01)
  *G06V 20/40* (2022.01)
  *G10L 25/30* (2013.01)
  *G11B 27/10* (2006.01)

(52) U.S. Cl.
  CPC .............. *G11B 27/10* (2013.01); *G06V 10/20* (2022.01); *G06V 20/40* (2022.01); *G10L 25/30* (2013.01)

(58) Field of Classification Search
  CPC ......... G06V 10/20; G06V 20/40; G10L 25/30
  USPC .............. 386/207, 200, 201, 239, 248, 326
  See application file for complete search history.

(56) References Cited

U.S. PATENT DOCUMENTS

| | | | | |
|---|---|---|---|---|
| 8,082,462 B1 * | 12/2011 | Tidwell | ..................... | G06F 1/12 |
| | | | | 713/400 |
| 2021/0210097 A1 | 7/2021 | Diamant et al. | | |
| 2022/0116633 A1 * | 4/2022 | Jiang | ..................... | G06N 3/084 |
| 2023/0110255 A1 * | 4/2023 | Chen | ..................... | G10L 19/02 |
| | | | | 704/500 |

FOREIGN PATENT DOCUMENTS

KR   10-2148607 B1   8/2020
KR   10-2021-0083535 A   7/2021

\* cited by examiner

*Primary Examiner* — Daquan Zhao
(74) *Attorney, Agent, or Firm* — Rabin & Berdo, P.C.

(57) ABSTRACT

Disclosed herein are an apparatus and method for audio-video sampling frequency ratio unification, including memory configured to store at least one program, and a processor configured to execute the program, wherein the program is configured to perform receiving an audio signal and a video signal, adjusting a ratio of a sampling frequency of the audio signal to a sampling frequency of the video signal so that the sampling frequency ratio is constant based on a deep learning network, and outputting an adjusted audio signal and the video signal.

13 Claims, 4 Drawing Sheets

APPARATUS AND METHOD FOR AUDIO-VIDEO SAMPLING FREQUENCY RATIO UNIFICATION

CROSS REFERENCE TO RELATED APPLICATION

This application claims the benefit of Korean Patent Application No. 10-2023-0023458, filed Feb. 22, 2023, which is hereby incorporated by reference in its entirety into this application.

BACKGROUND OF THE INVENTION

1. Technical Field

The following embodiments relate generally to audio and video multimodality recognition technology.

2. Description of the Related Art

Single modality-based speech recognition technology continues to be developed, and is currently being applied and serviced in various fields.

However, it may be very difficult or impossible to recognize speech only with single modality (audio) input information depending on a service environment. For example, there is the case where a speaker is detected in multi-speaker conversational situations or where speech recognition is performed in high-noise environments.

Currently, in order to overcome such a limitation, research into a multimodality-based deep learning model which simultaneously receives audio information and video information and complementarily utilizes two pieces of modality input information has been actively conducted. As representative examples, there may be audio-video modality-based speaker detection, lip reading-based speech recognition and voice extraction, etc.

However, due to a network structure which simultaneously receives audio and video, existing models are limited in that only predefined sampling frequency input formats are compatible with each other (e.g., 16 kHz-24 Frames Per Sec (FPS)) and are disadvantageous in that the modification of a network structure and retraining are required in order to change the input formats.

Furthermore, because learning data is limited to a specific sampling frequency format, it may be difficult to collect a large amount of data required for training.

SUMMARY OF THE INVENTION

An embodiment is intended to enable the use of learning data having audio-video input data formats corresponding to various combinations of sampling frequencies during the training of an audio-video multimodality-based deep learning model.

In accordance with an aspect of the present disclosure to accomplish the above object, there is provided an apparatus for audio-video sampling frequency ratio unification, including memory configured to store at least one program, and a processor configured to execute the program, wherein the program is configured to perform receiving an audio signal and a video signal, adjusting a ratio of a sampling frequency of the audio signal to a sampling frequency of the video signal so that the sampling frequency ratio is constant based on a deep learning network, and outputting an adjusted audio signal and the video signal.

The program may be configured to perform, in adjusting the ratio, adjusting the sampling frequency of the audio signal so that the ratio of the sampling frequency of the audio signal to the sampling frequency of the video signal is constant.

The deep learning network may be a temporal deformable convolutional network.

The program may be configured to perform, in adjusting the ratio, calculating the ratio of the sampling frequency of the audio signal to the sampling frequency of the video signal, and adjusting a size of a convolutional receptive field of the deep learning network depending on the calculated sampling frequency ratio.

The program may be configured to perform, in adjusting the size of the convolutional receptive field, when the sampling frequency ratio is greater than a preset constant value, adjusting the convolutional receptive field to be increased, and when the sampling frequency ratio is less than the preset constant value, adjusting the convolutional receptive field to be decreased.

The program may be configured to perform, in outputting the adjusted audio signal and the video signal, inputting the received video signal and the audio signal, the sampling frequency of which is converted, to an application based on the deep learning network.

In accordance with another aspect of the present disclosure to accomplish the above object, there is provided a method for audio-video sampling frequency ratio unification, including receiving an audio signal and a video signal, adjusting a ratio of a sampling frequency of the audio signal to a sampling frequency of the video signal so that the sampling frequency ratio is constant based on a deep learning network, and outputting an adjusted audio signal and the video signal.

Adjusting the ratio may include adjusting the sampling frequency of the audio signal so that the ratio of the sampling frequency of the audio signal to the sampling frequency of the video signal is constant.

The deep learning network may be a temporal deformable convolutional network.

Adjusting the ratio may include calculating the ratio of the sampling frequency of the audio signal to the sampling frequency of the video signal, and adjusting a size of a convolutional receptive field of the deep learning network depending on the calculated sampling frequency ratio.

Adjusting the size of the convolutional receptive field may include when the sampling frequency ratio is greater than a preset constant value, adjusting the convolutional receptive field to be increased, and when the sampling frequency ratio is less than the preset constant value, adjusting the convolutional receptive field to be decreased.

Outputting the adjusted audio signal and the video signal may include inputting the received video signal and the audio signal, the sampling frequency of which is converted, to an application based on the deep learning network.

In accordance with a further aspect of the present disclosure to accomplish the above object, there is provided an apparatus for audio-video sampling frequency ratio unification, including a memory configured to store at least one program, and a processor configured to execute the program, wherein the program is configured to perform receiving an audio signal and a video signal, adjusting a sampling frequency of the audio signal so that a ratio of the sampling frequency of the audio signal to a sampling frequency of the video signal is constant based on a temporal deformable convolutional network, and outputting an adjusted audio signal and the video signal.

The program is configured to perform, in adjusting the ratio, calculating the ratio of the sampling frequency of the audio signal to the sampling frequency of the video signal, and adjusting a size of a convolutional receptive field of the temporal deformable convolutional network depending on the calculated sampling frequency ratio.

The program may be configured to perform, in adjusting the size of the convolutional receptive field, when the sampling frequency ratio is greater than a preset constant value, adjusting the convolutional receptive field to be increased, and when the sampling frequency ratio is less than the preset constant value, adjusting the convolutional receptive field to be decreased.

The program may be configured to perform, in outputting the adjusted audio signal and the video signal, inputting the received video signal and the audio signal, the sampling frequency of which is converted, to an application based on the temporal deformable convolutional network.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
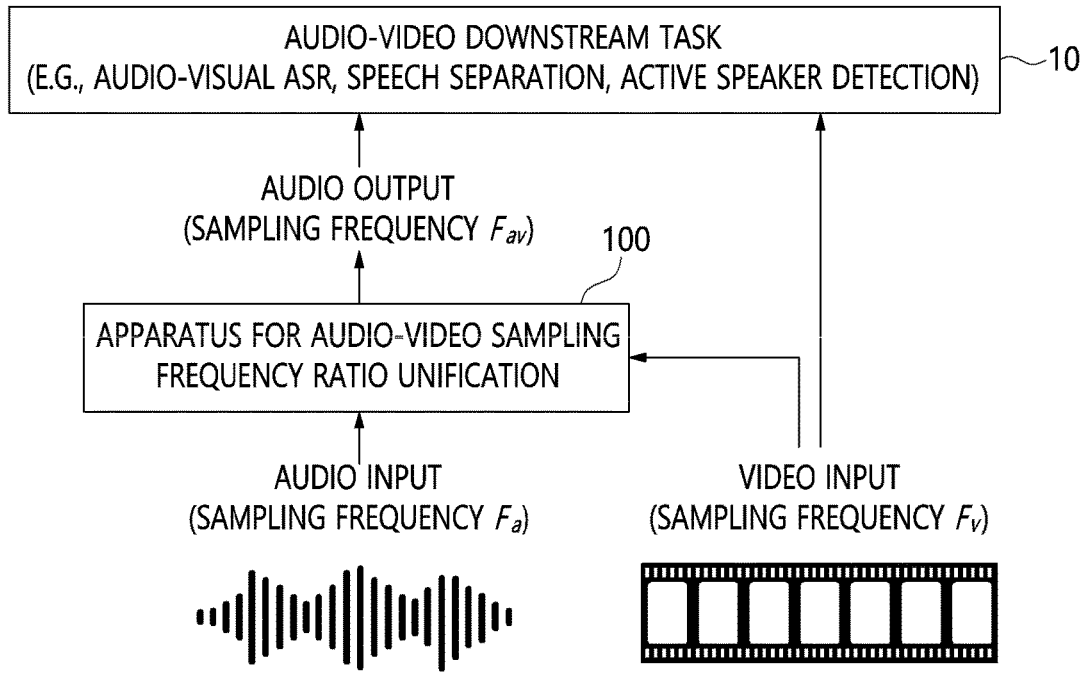
FIG. 1 is a diagram illustrating an example in which an apparatus for audio-video sampling frequency ratio unification is applied according to an embodiment.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Hereinafter, an apparatus and method for audio-video sampling frequency ratio unification according to embodiments will be described in detail with reference to FIGS. 1 to 5.

Figure 2:
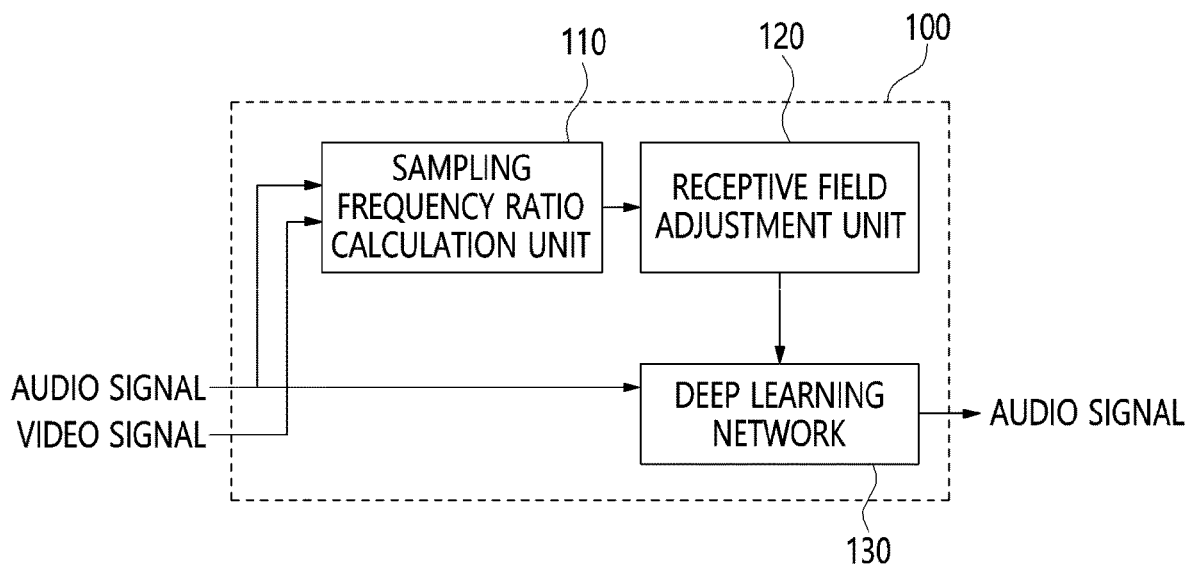
FIG. 2 is a block diagram illustrating the detailed configuration of an apparatus for audio-video sampling frequency ratio unification according to an embodiment.
Figure 3:
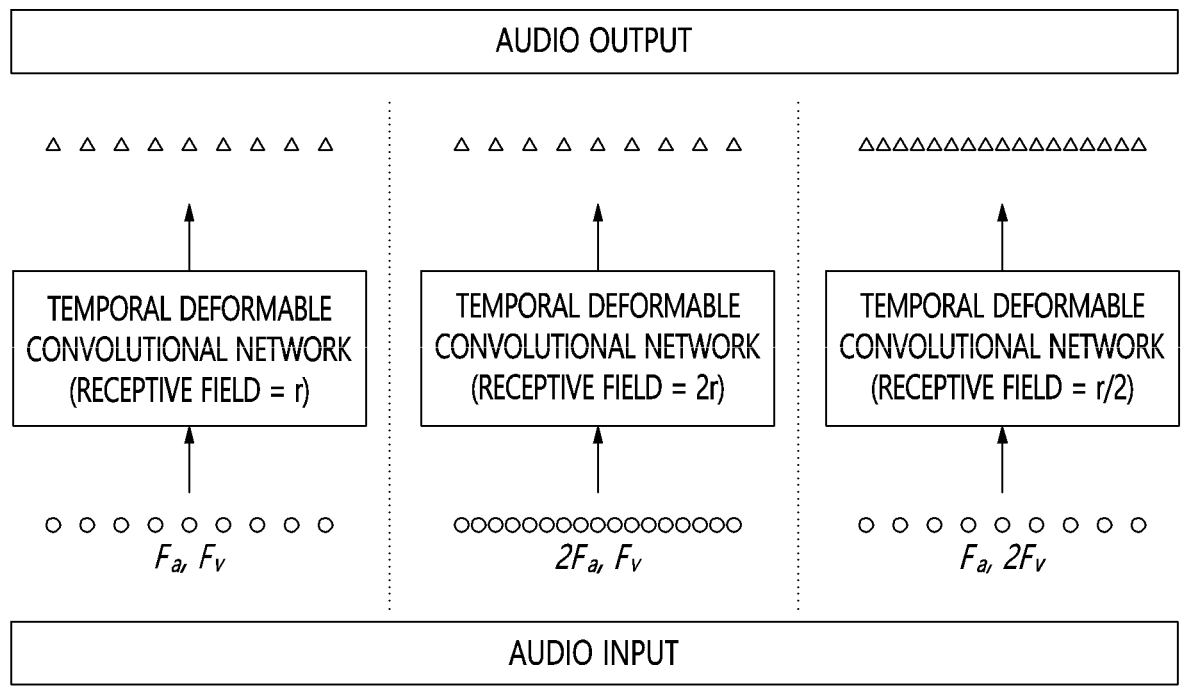
FIG. 3 is a diagram illustrating an example in which a receptive field is adjusted according to an embodiment.

FIG. 1 is a diagram illustrating an example in which an apparatus for audio-video sampling frequency ratio unification is applied according to an embodiment, FIG. 2 is a block diagram illustrating the detailed configuration of an apparatus for audio-video sampling frequency ratio unification according to an embodiment, and FIG. 3 is a diagram illustrating an example in which a receptive field is adjusted according to an embodiment.

Referring to FIG. 1, an apparatus 100 for audio-video sampling frequency ratio unification (hereinafter also referred to as an "audio-video sampling frequency ratio unification apparatus 100") according to the embodiment may convert audio-video sampling frequency ratios into a unified format desired by a user for audio-video input data formats having various combinations of sampling frequencies.

Here, the sampling frequencies of an audio input signal and a video input signal may be $F_a$ and $F_v$, respectively, and information corresponding thereto may be previously provided.

Here, the audio-video input data formats may vary, and may be, for example, 8 kHz-24 FPS, 16 kHz-30 FPS, 16 kHz-60 FPS, and 44.1 kHz-60 FPS.

The audio-video sampling frequency ratio unification apparatus 100 may unify the audio-video sampling frequency ratios of various audio-video input data formats based on a deep learning network. For example, the audio-video sampling frequency ratios may be unified into 500 Hz/Frame.

The audio-video sampling frequency ratio unification apparatus 100 may output an audio signal having a target frequency of $F_{av}$ based on the input audio-video sampling frequency ratio information.

Audio output obtained in this way may have a data format of a constant audio-video sampling frequency ratio, and may be utilized for model training (i.e., audio-video downstream task) required in order to apply various types of audio-video multimodality.

In this case, the model for applying the audio-video multimodality may include an audio-video modality-based speaker detection model, a lip reading-based speech recognition model, etc.

In detail, referring to FIG. 2, the audio-video sampling frequency ratio unification apparatus 100 may include a sampling frequency ratio calculation unit 110, a receptive field adjustment unit 120, and a deep learning network 130.

The sampling frequency ratio calculation unit 110 calculates the ratio of the sampling frequency of an audio signal to the sampling frequency of a video signal.

The receptive field adjustment unit 120 adjusts the size of the convolutional receptive field of the deep learning network 130 depending on the calculated sampling frequency ratio.

The deep learning network (or deep learning model) 130 outputs the audio signal, the sampling frequency of which is converted, using the convolutional receptive field adjusted as the audio signal and the video signal are input.

Here, the deep learning network 130 may be a temporal deformable convolutional network.

Referring to FIG. 3, for the input of audio and video sampling frequencies $F_a$ and $F_v$, which are references, the temporal deformable convolutional network may have a receptive field, the size of which is r.

Here, in the temporal deformable convolutional network, the size of the receptive field may be adjusted and used to perform operations, for input different from a combination of the reference sampling frequencies.

Here, when the sampling frequency ratio is greater than a preset constant value, the size of the receptive field is adjusted to be increased. For example, as illustrated in FIG. 3, when the audio and video sampling frequencies are $2F_a$ and $F_v$, respectively, the size of the receptive field may be 2r.

On the other hand, when the sampling frequency ratio is less than the preset constant value, the size of the receptive field is adjusted to be decreased. For example, as illustrated in FIG. 3, when the audio and video sampling frequencies are $F_a$ and $2F_v$, respectively, the size of the receptive field may be r/2.

Meanwhile, the temporal deformable convolutional network used as the deep learning network 130 will be described below.

A deformable convolutional network is a technique that was initially proposed in video recognition fields and variably applies a kernel operation region in the horizontal and vertical direction of a channel during a convolution operation performed based on a kernel having a preset size (e.g., 3×3).

In an embodiment, the deformable convolutional network is applied to a time-series domain, and may then be used to unify the audio-video sampling frequency ratio.

The operating method of the temporal deformable convolutional network will be described below.

It is intended to obtain output $y(t_i)$ of the deformable convolutional network, having a frequency of $F_{av}$, from given audio input $x(t_i)$. Here, $t_i$ is the reference time point of an input audio sample. A typical temporal convolution operation is represented by the following Equation (1):

$$y(t_i) = \sum_{t_n \in \mathcal{R}} w(t_n) x(t_i + t_n) \quad (1)$$

In FIG. 1, $\mathcal{R}$ denotes the receptive field, and $w(t_n)$ denotes the coefficient of a $t_n$-th kernel. For example, when $\mathcal{R} = \{-2, -1, 0, 1, 2\}$, a temporal convolution operation in which the size of the receptive field is 5 is obtained.

Here, a temporal deformable convolution operation may be represented by the following Equation (2).

$$y(t_i) = \sum_{t_n \in \mathcal{R}} w(t_n) x(t_i + t_n + \Delta t_n) \quad (2)$$

In Equation (2), $\Delta t_n$ may be a correction value for the channel location to which an n-th kernel coefficient is applied, and may be a factor for determining the time point of the input channel at which a larger weight is to be allocated.

The value of the time point t of the input channel obtained in this way is represented by the following Equation (3):

$$t = t_i + t_n + \Delta t_n = \sum_k G(k, t) x(k) \quad (3)$$

In Equation (3), G(k,t) may be defined by the following Equation (4).

$$G(k, t) = \max(0, t_{max} - |k - t|) \quad (4)$$

In Equation (4), G(k,t) is a function of assigning a larger weight as a temporal distance from a reference time point t is shorter.

That is, the temporal deformable convolutional network according to an embodiment may perform a convolution operation having a receptive field size determined by a combination of input audio-video frequencies, and may learn, in parallel with a multimodality model training procedure, the time point at which a weight is to be assigned and the degree of the weight to be assigned in the multimodality model training procedure during the convolution operation process.

Figure 4:
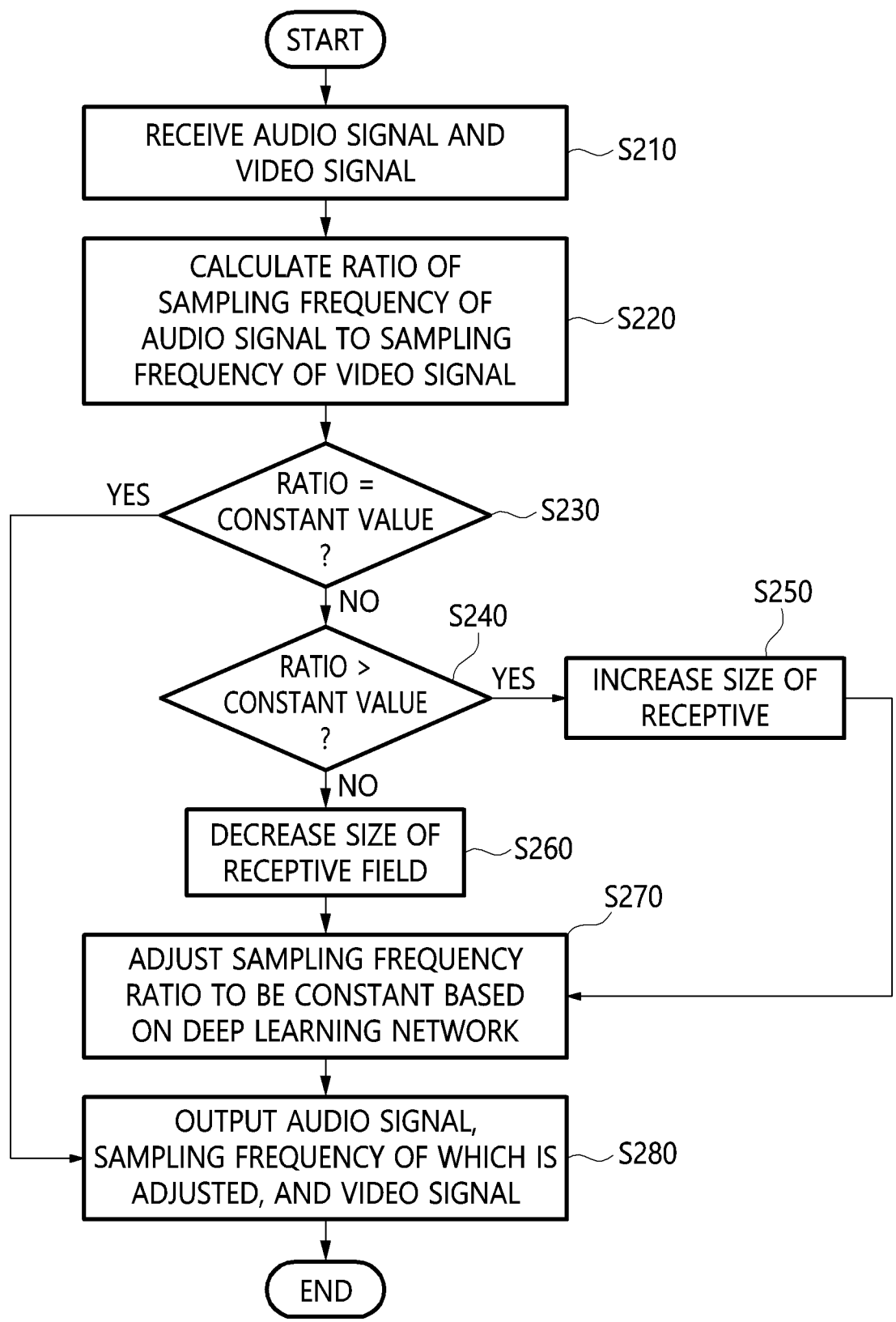
FIG. 4 is a flowchart for explaining a method for audio-video sampling frequency ratio unification according to an embodiment.

FIG. 4 is a flowchart for explaining a method for audio-video sampling frequency ratio unification according to an embodiment.

Referring to FIG. 4, the audio-video sampling frequency ratio unification method according to the embodiment may include step S210 of receiving an audio signal and a video signal, steps S220 to S270 of adjusting the ratio of the sampling frequency of the audio signal to the sampling frequency of the video signal so that the ratio is constant, based on a deep learning network (model), and step S280 of outputting an adjusted audio signal and the video signal.

At the adjusting steps S220 to S270, the audio-video sampling frequency ratio unification apparatus 100 calculate the ratio of the sampling frequency of the audio signal to the sampling frequency of the video signal at step S220.

Thereafter, the audio-video sampling frequency ratio unification apparatus 100 proceeds to step S280 when the calculated ratio of the sampling frequency of the audio signal to the sampling frequency of the video signal is a preset constant value. That is, as illustrated in FIG. 3, for the input of audio and video sampling frequencies $F_a$ and $F_v$, which are references, a temporal deformable convolutional network may have a receptive field, the size of which is r.

Meanwhile, when the calculated ratio of the sampling frequency of the audio signal to the sampling frequency of the video signal is greater than the preset constant value at step S240, the audio-video sampling frequency ratio unification apparatus 100 may adjust the size of the receptive field to be increased at step S250. For example, as illustrated in FIG. 3, when the audio and video sampling frequencies are $2F_a$ and $F_v$, respectively, the size of the receptive field may be 2r.

In contrast, when the calculated ratio of the sampling frequency of the audio signal to the sampling frequency of the video signal is not greater than the preset constant value at step S240, that is, when the sampling frequency ratio is less than the preset constant value, the audio-video sampling frequency ratio unification apparatus 100 adjusts the size of the receptive field to be decreased at step S260. For example, as illustrated in FIG. 3, when the sampling frequencies of the audio signal and the video signal are $F_a$ and $2F_v$, respectively, the size of the receptive field may be r/2.

Thereafter, the audio-video sampling frequency ratio unification apparatus 100 may adjust the sampling frequency ratio to be constant by generating an audio signal, the sampling frequency of which is converted, based on the deep learning network (model) that uses the adjusted receptive field at step S270.

Here, the deep learning network 130 may be a temporal deformable convolutional network.

Thereafter, the audio-video sampling frequency ratio unification apparatus 100 outputs the received video signal and the audio signal, the sampling frequency of which is adjusted (i.e., converted), at step S280.

The received video signal and the audio signal, the sampling frequency of which is adjusted, may be used to train a model for applying audio-video multimodality.

Figure 5:
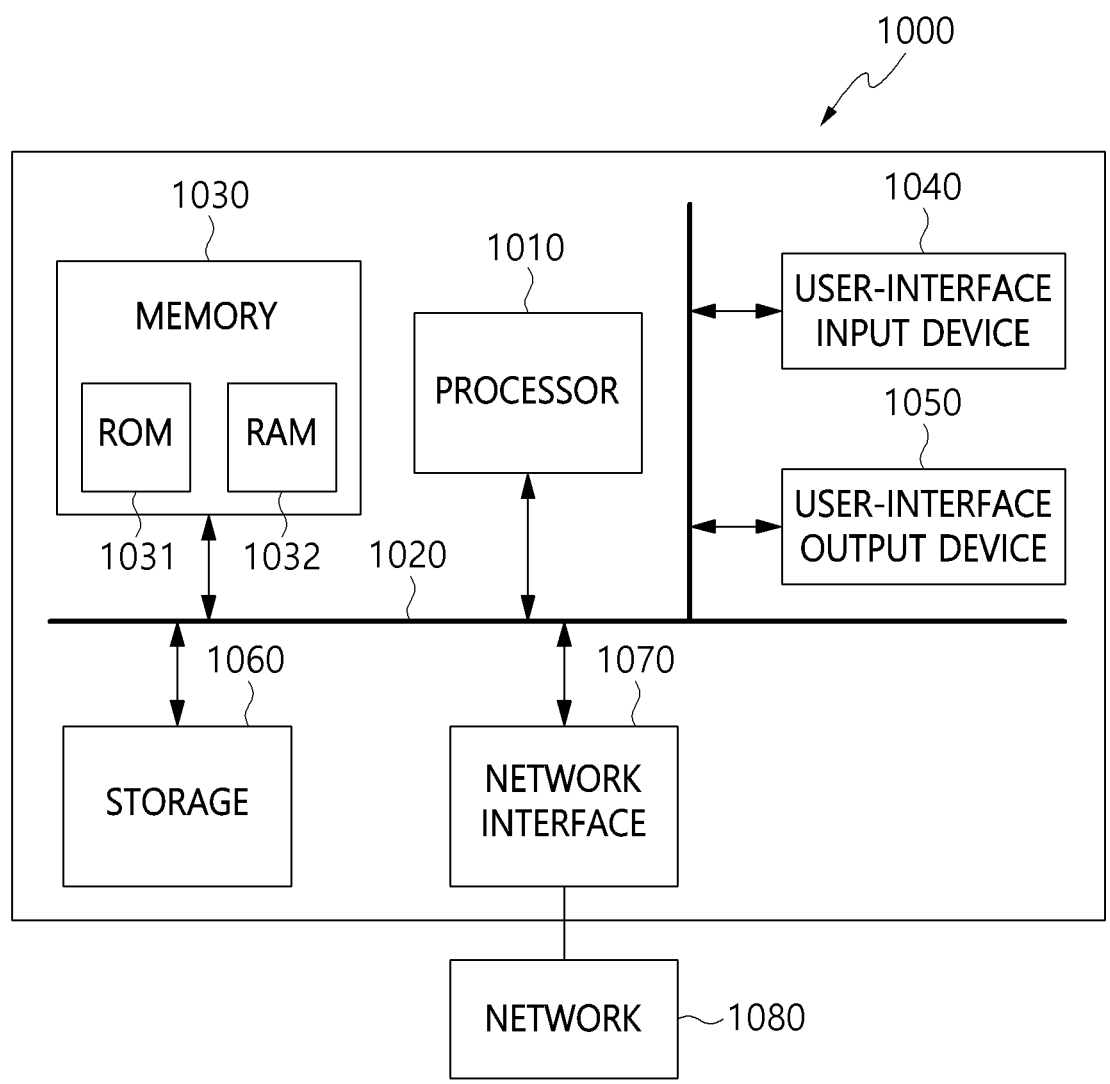
FIG. 5 is a diagram illustrating the configuration of a computer system according to an embodiment.

FIG. 5 is a diagram illustrating the configuration of a computer system according to an embodiment.

An apparatus for audio-video sampling frequency ratio unification according to an embodiment may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium or an information delivery medium, or a combination thereof. For example, the memory 1030 may include Read-Only Memory (ROM) 1031 or Random Access Memory (RAM) 1032.

In accordance with the embodiments, learning data having audio-video input data formats corresponding to various combinations of sampling frequencies may be used during the training of the audio-video multimodality-based deep learning network (model).

Although the embodiments of the present disclosure have been disclosed with reference to the attached drawing, those skilled in the art will appreciate that the present disclosure can be implemented in other concrete forms, without changing the technical spirit or essential features of the disclosure. Therefore, it should be understood that the foregoing embodiments are merely exemplary, rather than restrictive, in all aspects.

What is claimed is:

1. An apparatus for audio-video sampling frequency ratio unification, comprising:
    a memory configured to store at least one program; and
    a processor configured to execute the program,
    wherein the program is configured to perform:
    receiving an audio signal and a video signal,
    adjusting a ratio of a sampling frequency of the audio signal to a sampling frequency of the video signal so that the sampling frequency ratio is constant based on a deep learning network, and
    outputting an adjusted audio signal and the video signal,
    wherein the program is configured to perform,
    in adjusting the ratio, calculating the ratio of the sampling frequency of the audio signal to the sampling frequency of the video signal, and
    adjusting a size of a convolutional receptive field of the deep learning network depending on the calculated sampling frequency ratio.

2. The apparatus of claim 1, wherein the program is configured to perform,
    in adjusting the ratio, adjusting the sampling frequency of the audio signal so that the ratio of the sampling frequency of the audio signal to the sampling frequency of the video signal is constant.

3. The apparatus of claim 2, wherein the program is configured to perform,
    in outputting the adjusted audio signal and the video signal, inputting the received video signal and the audio signal, the sampling frequency of which is converted, to an application based on the deep learning network.

4. The apparatus of claim 1, wherein the deep learning network is a temporal deformable convolutional network.

5. The apparatus of claim 1, wherein the program is configured to perform,
    in adjusting the size of the convolutional receptive field, when the sampling frequency ratio is greater than a preset constant value, adjusting the convolutional receptive field to be increased, and
    when the sampling frequency ratio is less than the preset constant value, adjusting the convolutional receptive field to be decreased.

6. A method for audio-video sampling frequency ratio unification, comprising:
    receiving an audio signal and a video signal;
    adjusting a ratio of a sampling frequency of the audio signal to a sampling frequency of the video signal so that the sampling frequency ratio is constant based on a deep learning network; and
    outputting an adjusted audio signal and the video signal,
    wherein adjusting the ratio comprises:
    calculating the ratio of the sampling frequency of the audio signal to the sampling frequency of the video signal; and
    adjusting a size of a convolutional receptive field of the deep learning network depending on the calculated sampling frequency ratio.

7. The method of claim 6, wherein adjusting the ratio comprises:
    adjusting the sampling frequency of the audio signal so that the ratio of the sampling frequency of the audio signal to the sampling frequency of the video signal is constant.

8. The method of claim 7, wherein outputting the adjusted audio signal and the video signal comprises:
    inputting the received video signal and the audio signal, the sampling frequency of which is converted, to an application based on the deep learning network.

9. The method of claim 6, wherein the deep learning network is a temporal deformable convolutional network.

10. The method of claim 6, wherein adjusting the size of the convolutional receptive field comprises:
    when the sampling frequency ratio is greater than a preset constant value, adjusting the convolutional receptive field to be increased; and
    when the sampling frequency ratio is less than the preset constant value, adjusting the convolutional receptive field to be decreased.

11. An apparatus for audio-video sampling frequency ratio unification, comprising:
  a memory configured to store at least one program; and
  a processor configured to execute the program,
  wherein the program is configured to perform:
  receiving an audio signal and a video signal,
  adjusting a sampling frequency of the audio signal so that a ratio of the sampling frequency of the audio signal to a sampling frequency of the video signal is constant based on a temporal deformable convolutional network, and
  outputting an adjusted audio signal and the video signal,
  wherein the program is configured to perform,
  in adjusting the ratio, calculating the ratio of the sampling frequency of the audio signal to the sampling frequency of the video signal, and
  adjusting a size of a convolutional receptive field of the temporal deformable convolutional network depending on the calculated sampling frequency ratio.

12. The apparatus of claim 11, wherein the program is configured to perform,
  in adjusting the size of the convolutional receptive field, when the sampling frequency ratio is greater than a preset constant value, adjusting the convolutional receptive field to be increased, and
  when the sampling frequency ratio is less than the preset constant value, adjusting the convolutional receptive field to be decreased.

13. The apparatus of claim 12, wherein the program is configured to perform, in outputting the adjusted audio signal and the video signal, inputting the received video signal and the audio signal, the sampling frequency of which is converted, to an application based on the temporal deformable convolutional network.

* * * * *